United States Patent
Yue et al.

(10) Patent No.: US 9,805,715 B2
(45) Date of Patent: Oct. 31, 2017

(54) METHOD AND SYSTEM FOR RECOGNIZING SPEECH COMMANDS USING BACKGROUND AND FOREGROUND ACOUSTIC MODELS

(71) Applicant: Tencent Technology (Shenzhen) Company Limited, Shenzhen (CN)

(72) Inventors: Shuai Yue, Shenzhen (CN); Li Lu, Shenzhen (CN); Xiang Zhang, Shenzhen (CN); Dadong Xie, Shenzhen (CN); Haibo Liu, Shenzhen (CN); Bo Chen, Shenzhen (CN); Jian Liu, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 377 days.

(21) Appl. No.: 14/106,634

(22) Filed: Dec. 13, 2013

(65) Prior Publication Data

US 2014/0214416 A1    Jul. 31, 2014

Related U.S. Application Data

(60) Provisional application No. PCT/CN2013/085738, filed on Oct. 23, 2013.

(30) Foreign Application Priority Data

Jan. 30, 2013 (CN) .......................... 2013 1 0035979

(51) Int. Cl.
G10L 15/14 (2006.01)
G10L 15/08 (2006.01)
G10L 15/32 (2013.01)

(52) U.S. Cl.
CPC ............ *G10L 15/14* (2013.01); *G10L 15/083* (2013.01); *G10L 15/32* (2013.01); *G10L 2015/088* (2013.01)

(58) Field of Classification Search
CPC . G10L 15/08; G10L 15/083; G10L 2015/088; G10L 15/10; G10L 15/14; G10L 15/20; G10L 15/32; G10L 25/78
(Continued)

(56) References Cited

U.S. PATENT DOCUMENTS 6,098,040 A    8/2000 Petroni et al.
6,539,353 B1 *  3/2003 Jiang .................... G10L 15/142
                                                 704/252
(Continued)

FOREIGN PATENT DOCUMENTS

CN    1588535 A    3/2005
EP    2058797 A1   5/2009

OTHER PUBLICATIONS

Rose, Richard C., et al. "A hidden Markov model based keyword recognition system." Acoustics, Speech, and Signal Processing, 1990. ICASSP-90., 1990 International Conference on. IEEE, Apr. 1990, pp. 129-132.*

(Continued)

*Primary Examiner* — James Wozniak
(74) *Attorney, Agent, or Firm* — Morgan, Lewis & Bockius LLP

(57) ABSTRACT

A method of recognizing speech commands includes generating a background acoustic model for a sound using a first sound sample, the background acoustic model characterized by a first precision metric. A foreground acoustic model is generated for the sound using a second sound sample, the foreground acoustic model characterized by a second precision metric. A third sound sample is received and decoded (Continued)

by assigning a weight to the third sound sample corresponding to a probability that the sound sample originated in a foreground using the foreground acoustic model and the background acoustic model. The method further includes determining if the weight meets predefined criteria for assigning the third sound sample to the foreground and, when the weight meets the predefined criteria, interpreting the third sound sample as a portion of a speech command. Otherwise, recognition of the third sound sample as a portion of a speech command is forgone.

17 Claims, 12 Drawing Sheets

(58) Field of Classification Search
USPC .............................. 704/233, 251, 255, 275
See application file for complete search history.

(56) References Cited

U.S. PATENT DOCUMENTS

| | | | | |
|---|---|---|---|---|
| 8,014,536 | B2* | 9/2011 | Attias | H04R 3/005 381/56 |
| 2002/0055840 | A1* | 5/2002 | Yamada | G10L 15/063 704/245 |
| 2002/0087306 | A1* | 7/2002 | Lee | G06Q 30/06 704/233 |
| 2002/0169602 | A1* | 11/2002 | Hodges | G10L 25/78 704/211 |
| 2003/0004717 | A1 | 1/2003 | Strom et al. | |
| 2003/0004720 | A1* | 1/2003 | Garudadri | G10L 15/30 704/247 |
| 2003/0200086 | A1* | 10/2003 | Kawazoe | G10L 15/20 704/239 |
| 2004/0199384 | A1* | 10/2004 | Hong | G10L 15/063 704/233 |
| 2005/0159951 | A1* | 7/2005 | Attias | G10L 15/14 704/240 |
| 2005/0228666 | A1* | 10/2005 | Liu | G10L 15/187 704/256 |
| 2005/0273334 | A1* | 12/2005 | Schleifer | G10L 15/08 704/255 |
| 2005/0288929 | A1* | 12/2005 | Kuboyama | G10L 15/142 704/251 |
| 2006/0155537 | A1* | 7/2006 | Park | G10L 25/78 704/243 |
| 2006/0206326 | A1* | 9/2006 | Fukada | G10L 15/187 704/239 |
| 2006/0241937 | A1* | 10/2006 | Ma | G10L 25/78 704/206 |
| 2006/0247927 | A1* | 11/2006 | Robbins | H03G 3/32 704/225 |
| 2007/0136058 | A1* | 6/2007 | Jeong | G10L 15/08 704/240 |
| 2007/0219797 | A1* | 9/2007 | Liu | G10L 15/08 704/257 |
| 2009/0056526 | A1* | 3/2009 | Yamashita | G10H 1/40 84/611 |
| 2010/0030558 | A1* | 2/2010 | Herbig | G10L 25/78 704/240 |
| 2011/0103615 | A1* | 5/2011 | Sun | G10L 21/0208 381/94.3 |
| 2012/0224706 | A1* | 9/2012 | Hwang | G10L 15/10 381/56 |

OTHER PUBLICATIONS

Hao, Jiucang, et al. "Speech enhancement using gaussian scale mixture models." Audio, Speech, and Language Processing, IEEE Transactions on 18.6, Aug. 2010, pp. 1127-1136.*

Wilpon, Jay G., et al. "Automatic recognition of keywords in unconstrained speech using hidden Markov models." Acoustics, Speech and Signal Processing, IEEE Transactions on 38.11, Nov. 1990, pp. 1870-1878.*

Zavaliagkos, et al. "Maximum a posteriori adaptation for large scale HMM recognizers." Acoustics, Speech, and Signal Processing, 1996. ICASSP-96. Conference Proceedings., 1996 IEEE International Conference on. vol. 2. IEEE, May 1996, pp. 725-728.*

Tencent Technology, ISR, PCT/CN2013/085738, dated Feb. 27, 2014, 3 pgs.

Tencent Technology, Written Opinion, PCT/CN2013/085738, dated Feb. 27, 2014, 5 pgs.

Tencent Technology, IPRP, PCT/CN2013/085738, dated Aug. 4, 2015, 6 pgs.

* cited by examiner

METHOD AND SYSTEM FOR RECOGNIZING SPEECH COMMANDS USING BACKGROUND AND FOREGROUND ACOUSTIC MODELS

RELATED APPLICATIONS

This application is a continuation application of PCT Patent Application No. PCT/CN2013/085738, entitled "METHOD AND SYSTEM FOR RECOGNIZING SPEECH COMMANDS" filed on Oct. 23, 2013, which claims priority to Chinese Patent Application No. 201310035979.1, entitled "METHOD AND SYSTEM FOR RECOGNIZING SPEECH COMMANDS," filed on Jan. 30, 2013, both of which are herein incorporated by reference in their entirety.

FIELD OF THE INVENTION

The present application relates generally to the field of automatic speech recognition (ASR), and relates specifically to a method and system for recognizing speech commands.

BACKGROUND OF THE INVENTION

Automatic speech recognition is an area of technology which transforms the lexical content of human speech into an input form (e.g., a character string) that can be read by computers. The process of automatic speech recognition typically includes several operations, including: generating a language model that contains a plurality of words in a corpus, training an acoustic model to create statistical representations of one or more contrastive units of sound (called "phonemes" or simply "phones") that make up each word in the corpus, building a decoding network using the language model and the acoustic model, and finally decoding human speech.

Recognition of speech commands is a specific application of automatic speech recognition technology. Specifically, recognition of speech commands allows a user to input commands by speaking a phrase (e.g., into a microphone) rather than interacting with a device through conventional physical user input apparatus, such as a mouse, keyboard, touch screen, and so on. The decoding network translates the spoken phrase into an input form and attempts to match the input form to an input command. When the input form is recognized as a command, the device triggers an operation corresponding to the command.

As an example, a device may have a wake-up operation in which the device transitions from a "sleep mode" (e.g., a power save mode, or a screen-saver mode) to an "active mode" of normal use. Several user inputs may suffice to trigger the wake operation, such as a mouse click and/or one or more speech commands corresponding to the wake-up operation (e.g., "wake-up" or "turn on"). When a user speaks the words "turn on," the device triggers the wake up operation.

The quality of a speech command recognition system is often measured by two metrics: a false acceptance rate and a false rejection rate. The false acceptance rate is a measure of a rate at which audio input received by the device is mistakenly interpreted as a speech command (e.g., when no such command has been uttered). The false rejection rate is a measure of a rate at which the device fails to recognize speech commands that have been delivered. Using conventional methods of speech command recognition, the false acceptance rate is generally unacceptably high, especially in noisy environments (e.g., environments with a high level of background noise). This leads to frustrations on the part of the user and lack of utilization of speech command recognition systems.

SUMMARY

To address the aforementioned problems, some implementations of the present application provide a computer-implemented method of recognizing speech commands. The method includes generating a background acoustic model for a sound using a first sound sample. The background acoustic model is characterized by a first precision metric that is less than a first predefined value. A foreground acoustic model is generated for the sound using a second sound sample. The foreground acoustic model is characterized by a second precision metric that is greater than a second predefined value. The method further includes receiving a third sound sample corresponding to the sound, and decoding the third sound sample by assigning a first weight to the third sound sample corresponding to a probability that the sound sample originated in a foreground using the foreground acoustic model and the background acoustic model. The method further includes determining if the first weight meets predefined criteria for assigning the third sound sample to the foreground. In accordance with a determination that the first weight meets the predefined criteria, the third sound sample is interpreted as a portion of a speech command. Otherwise, in accordance with a determination that the first weight does not meet the predefined criteria, the method recognition of the third sound sample as a portion of a speech command is forgone.

In another aspect of the present application, to address the aforementioned problems, some implementations provide a non-transitory computer readable storage medium storing one or more programs. The one or more programs comprise instructions, which when executed by an electronic device with one or more processors and memory, cause the electronic device to perform any of the methods provided herein.

In yet another aspect of the present application, to address the aforementioned problems, some implementations provide an electronic device. The electronic device includes one or more processors, memory, and one or more programs. The one or more programs are stored in memory and configured to be executed by the one or more processors. The one or more programs include an operating system and instructions that when executed by the one or more processors cause the electronic device to perform any of the methods provided herein.

BRIEF DESCRIPTION OF THE DRAWINGS

For a better understanding, reference should be made to the following detailed description taken in conjunction with the accompanying drawings, in which.

Like reference numerals and names refer to corresponding parts throughout the drawings.

DESCRIPTION OF EMBODIMENTS

Figure 1:
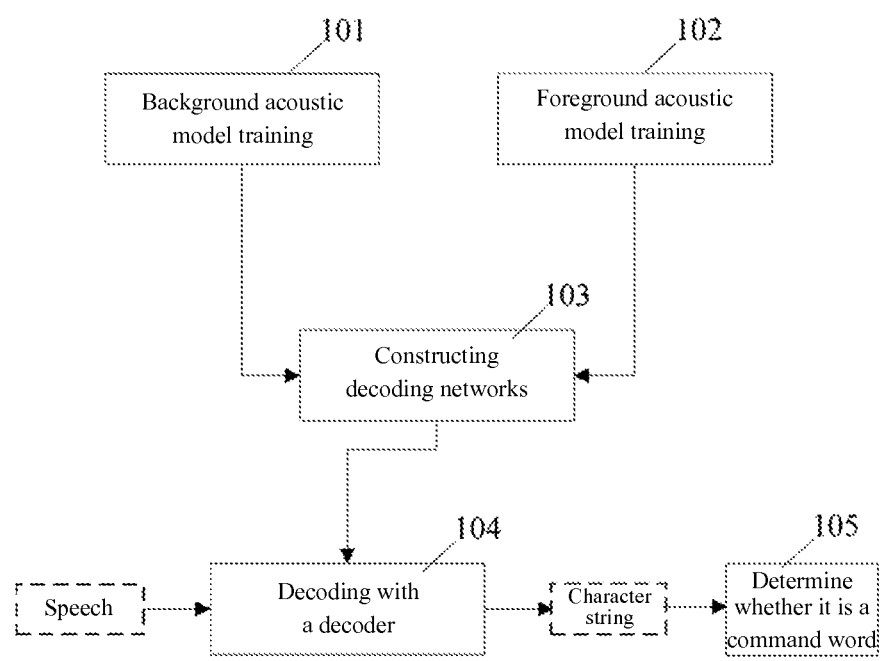
FIG. 1 is a flowchart diagram of a method of speech command recognition, in accordance with some implementations.

The present application provides a method and system for recognizing speech commands. In speech recognition, a pertinent task is to receive a sound sample (e.g., a time series of acoustic data) and assign the sound sample a probability corresponding to the likelihood that the sound sample represents a particular unit of speech in a language's phonology (e.g., a monophone or a triphone). This is done using a so-called "acoustic model." For example, a system will receive a sound sample sounding like "aaaaa" and, using an acoustic model for the vowel /a/, the system will assign the sound sample a probability that it represents an articulation of the vowel /a/. Likewise, using an acoustic model for the vowel /e/, the system will assign the sound sample a lesser probability that it represents an articulation of the vowel /e/, and in an analogous manner will assign the sound sample a still lesser probability that it representations an articulation of the consonant /p/. In some circumstances, the sound with the highest corresponding probability (e.g., the most likely sound) is selected as the "actual" sound that was articulated. Combining the acoustic model with a language model, these probabilities are used to construct words and phrases which are then interpreted as speech commands.

However, when a user attempts to input a speech command in a noisy environment, the system receives acoustic data from both a foreground (e.g., the user's speech) and a background. For example, the user may be attempting to input the speech command "Wake up" (e.g., the foreground) while a nearby person is stating the words "I went to the game last night." Using a single acoustic model for each sound, the system will not be able to disambiguate between sounds originating in the foreground sounds originating in the background. To address this problem, some implementations of the present application utilize the fact acoustic data originating in the foreground is, in fact, distinguishable from acoustic data originating in the background at least due to the fact that acoustic data originating in the background will map to a most likely sound with a good deal less precision than acoustic data originating in the foreground. To that end, some implementations of the present application utilize a mixture model in which a foreground acoustic model (e.g., trained on foreground acoustic data) and a background acoustic model (e.g., trained on background acoustic data) are sub-models. In this manner, in some implementations, the system and method provided herein will assign the sound sample a probability that it represents an articulation of a respective sound, as a well as a probability that the articulation of the respective sound originated in the foreground or the background. In some implementations, the sound sample is assigned to a respective sound (e.g., the sound with the highest probability compared to other sounds for which there is an acoustic model), and the sound sample is disregarded if the system determines that it sound was articulated in the background. This results in a lower false acceptance rate, thereby providing more satisfactory speech command recognition, increasing user satisfaction, and, for battery operated devices, prolonging battery life by obviating the need for repeating speech commands.

Reference will now be made in detail to various implementations, examples of which are illustrated in the accompanying drawings. In the following detailed description, numerous specific details are set forth in order to provide a thorough understanding of the present disclosure and the described implementations herein. However, implementations described herein may be practiced without these specific details. In other instances, well-known methods, procedures, components, and mechanical apparatus have not been described in detail so as not to unnecessarily obscure aspects of the implementations.

FIG. 1 is a flowchart of a method of speech command recognition, in accordance with some implementations. In some implementations, one or more operations in the method are performed at a portable device (e.g., client device 808/810, FIG. 8). In some implementations, one or more operations in the method are performed at a server system (e.g., server system 811, FIG. 8).

The method includes operation 101, in which the device trains a background acoustic model (e.g., using a first sound sample). The resultant background acoustic model is characterized a low phoneme precision. In this manner, the device obtains a background acoustic model having a low phoneme precision.

The method includes operation 102, in which the device trains a foreground acoustic model (e.g., using a second sound sample). The resultant foreground acoustic model is characterized by a high phoneme precision. In this manner, the device obtains a foreground acoustic model having a high phoneme precision, so as to elevate the speech recognition precision of a command word.

It should be understood that the aforementioned operations 101 and 102 do not necessarily proceed according to the given order. For example, in some implementations, operations 101 and 102 proceed at the same time. Alternatively, in some implementations, operation 102 precedes operation 101.

The method includes operation 103, in which the device builds a decoding network in accordance with the foreground acoustic model and the background acoustic model. In some implementations, operation 103 further includes: selecting a phoneme contained in a command word from the foreground acoustic model, using the selected phoneme to construct a decoding path corresponding to the command word, and constructing a corresponding decoding path according to the phoneme of the background acoustic model.

The method includes operation 104, in which the device decodes a speech input according to the decoding network.

The method includes operation 105, in which, after the speech input ends, the device judges whether a result of the decoding operation is a character string of a command word.

When the decoding result is a character string of a command word, the device triggers a device operation corresponding to the command word.

For example, the present application can be applied to a speech wakeup system, in which the device responds to a wake up command by waking up (e.g., transitioning out of a power save mode). Assuming that the wakeup command is "Wechat assistant," when the user speaks the words "Wechat assistant," the system will automatically recognize the character string "Wechat assistant," and correspondingly trigger the wake up operation.

The acoustic model is one of the most important aspects of a speech recognition system. Most of the mainstream speech recognition systems adopt Hidden Markov Models (HMM) to construct acoustic models. An HMM is a statistical model which is used to describe a Markov process containing a hidden parameter (e.g., a parameter that is not directly observed). In an HMM, although the hidden parameter is not directly observed, one or more variables affected by the hidden parameter are observed. In the context of speech recognition, a spoken phoneme is considered a hidden parameter, whereas acoustic data received (e.g., by a microphone of the device) is the observed variable. The corresponding probability between the spoken phoneme and the acoustic data is described in the acoustic model (e.g., the acoustic model describes the probability that acoustic data was generated by a user speaking a particular phoneme).

As used herein, in some implementations, the term phoneme can mean a minimum phonetic unit divided according to the natural property of speech (e.g., phonologically). Alternatively, the term phoneme can mean a minimum phonetic unit divided according to the received sound (e.g., according to a sampling rate of the device). Alternatively, the term phoneme can mean a result of a physiological articulation action during speech.

The aforementioned training of the foreground acoustic model and the background acoustic model can be realized using existing methods known in the art. For example, acoustic model training can be performed using the Hidden Markov Model Toolkit (HTK) and the processes provided therein.

In Operation 101, during the training of the background acoustic model, as much speech data as possible is used. In order to be lower than the specified precision, operation 101 is optionally characterized in that a Gaussian number B1 in a Gaussian mixture model (GMM) for the description of a phoneme shall be lower than a specified value. For example, in some implementations, the Gaussian number B1 in the Gaussian mixture model for the description of phoneme is in the range of 4 to 8. The GMM can effectively extract the speaker's characteristics in the speech signal, and get rid of speech disfluencies (e.g., "um") and other redundant information, thereby fully reflecting the statistical distribution of the speaker's characteristics, which is now the mainstream technology of speech recognition.

In Operation 102, during the training of the foreground acoustic model, as much speech data as possible is used. In order to be higher than the specified precision, operation 102 is optionally characterized in that a Gaussian number B2 in the Gaussian mixture model for the description of phoneme shall be higher than the specified value, and the mentioned B2 shall be higher than the Gaussian number B1. For example, in some implementations, the mentioned B2 is in the range of 16-32 or, alternatively, over 32.

In some implementations, during the training of the background acoustic model in Operation 101, sounds received by the device are represented as monophones. In some implementations, sounds received by the device are represented as triphones.

For example, in some implementations, the operation 101 includes: training an acoustic model by representing sounds as monophones to obtain a monophone acoustic model, and using the obtained monophone acoustic model as the background acoustic model. In some implementations, the Gaussian number B1 in the Gaussian mixture model for the description of the mentioned monophone shall be lower than the specified value, for example, in the range of 4-8.

Alternatively, in some implementations, the operation 101 includes: training an acoustic model by representing sounds as triphones to obtain a triphone acoustic model, clustering the triphones for the triphone acoustic model, and using the triphone acoustic model after clustering as the background acoustic model. In some implementations, the Gaussian number B1 in the Gaussian mixture model for the description of the mentioned triphone shall be lower than the specified value, for example, in the range of 4-8.

In some implementations, during the training of the foreground acoustic model in operation 102, triphones with a higher precision are used (e.g., higher than those used for operation 101). Alternatively, training operation 102 can use monophones with a lower precision, but these monophones shall comprise an embedded HMM (Hidden Markov Model) sequence, for example, the Gaussian number in GMM for the description of these monophones shall be large, generally 32 or much bigger value.

In some implementations, the operation 102 includes: training an acoustic model using a triphone representation of speech to obtain a triphone acoustic model. In some implementations, the Gaussian number B2 in the GMM of each triphone in the triphone acoustic model shall be higher than the specified value. For example, in some implementations, B2 is in the range of 16-32 or, alternatively, over 32. In some implementations, the operation 102 further includes using speech inputs corresponding to command words to further refine the obtained triphone acoustic model, and using the refined triphone acoustic model as the foreground acoustic model.

In some implementations, the operation 102 includes training an acoustic model using a monophone representation of speech to obtain a monophone acoustic model. In some implementations, the Gaussian number B2 in the GMM of each monophone shall be higher than the specified value B2. For example, B2 is larger than 32. In some implementations, the operation 102 further includes using speech inputs corresponding to command words to further refine the obtained monophone acoustic model, and using the refined monophone acoustic model as the foreground acoustic model.

Figure 2:
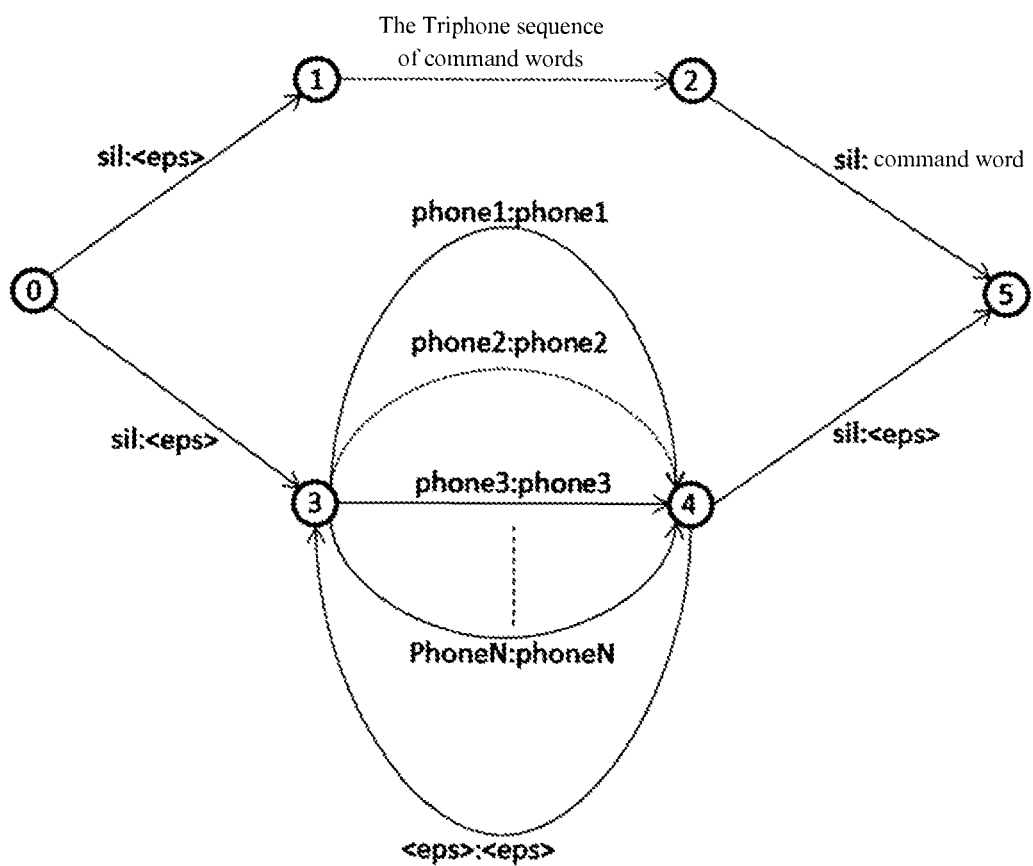
FIG. 2 is a schematic diagram of a decoding network constructed using a foreground acoustic model and a background acoustic model, in accordance with some implementations.

FIG. 2 is a schematic diagram of a decoding network constructed using the foreground acoustic model and the background acoustic model, in accordance with some implementations. As shown in FIG. 2, in some implementations, the foreground acoustic model is a triphone acoustic model and the background acoustic model is the monophone acoustic model. The constructed decoding network is a Weighted Finite State Transducer (WFST) network (specifically FIG. 2 illustrates the corresponding decoding network in the form of a WFST network). Each side in FIG. 2 has two labels, like sil:<eps>. The label on the left of colon is an input label, representing the HMM in the decoding process required to pass through this place. The label on the right of colon is an output label, representing the output symbol after passing through this place. The decoding network in FIG. 2 can be divided into two parts, path 0, 1, 2, 5 and path 0, 3, 4, 5. In this example, path 0, 1, 2, 5 contains the triphone sequence of a command word. The path 0, 1, 2, 5 is built by choosing all of the triphones contained in this command word from the mentioned foreground acoustic model and then constructing the path using these triphones. In the decoding process, a token passing through this path needs to pass through all the triphones corresponding to the command word. Therefore, it will increase the recognition rate to the speech of the command word. If the recognition of over two command words is required, it can aim at each command word, choosing the triphones contained in the command word from the mentioned foreground acoustic model, and then using the chosen triphones contained in the command word to construct a decoding path corresponding to this command word.

Referring to FIG. 2, the path 0, 3, 4, 5 contains the sequences of all monophones. The path 0, 3, 4, 5 is constructed according to all monophones of the mentioned background acoustic model, between node 3 to node 4, the path contains N segments in parallel which use monophones as the input and output symbol. Each monophone in the mentioned background acoustic model corresponds to one segment. At the same time, an empty edge returns again from node 4 to node 3. Therefore, in the decoding process, a token can transfer between node 3 and 4 again and again through the edges from 4 to 3. When what the user said is not a command word, this path can express the contents that the user said. For a token passing through the path 0, 3, 4, 5, its output is the sequence of a phones (e.g., a string).

The character strings output at the terminal node 5 shall be ranked in order of probability value. Finally, the character string with the highest probability value is selected as the decoding result. If the speech input is a command word, the probability of the character strings output from the path 0, 1, 2, 5 shall be higher than the probability of the character strings output from the path 0, 3, 4, 5. Therefore the character strings corresponding to this command word can be correctly recognized. If the speech input is not a command word, the probability of the character strings output from the path 0, 1, 2, 5 shall be lower than the probability of the character strings output from the path 0, 3, 4, 5. However, the character strings output from the path 0, 3, 4, 5 is not a character strings corresponding to a command word. Therefore, the character string with the highest probability value is recognized as not a command word. Thus, it can correctly recognize whether the input speech is the specified command word or not.

In some implementations, the decoder uses token passing. Under an embedded environment, in order to increase speed and reduce the amount of memory that the decoder is occupying, the token passing keeps the character string with the highest probability value (e.g., the optimized value) as the decoding result and discards the other strings. If the optimized value contains a command word, it is interpreted as a command word, and the corresponding device operation is activated (e.g., waking up the corresponding devices). Otherwise, the character string is not considered a command word.

In some implementations, two or more character strings with probability values ranking at the top can be used as the decoding results. If these character strings contain the command word, it is considered that the user has said the command word, triggering the operation corresponding to the command word, like waking up the corresponding device, otherwise it is considered that the user did not say the command word.

Figure 3:
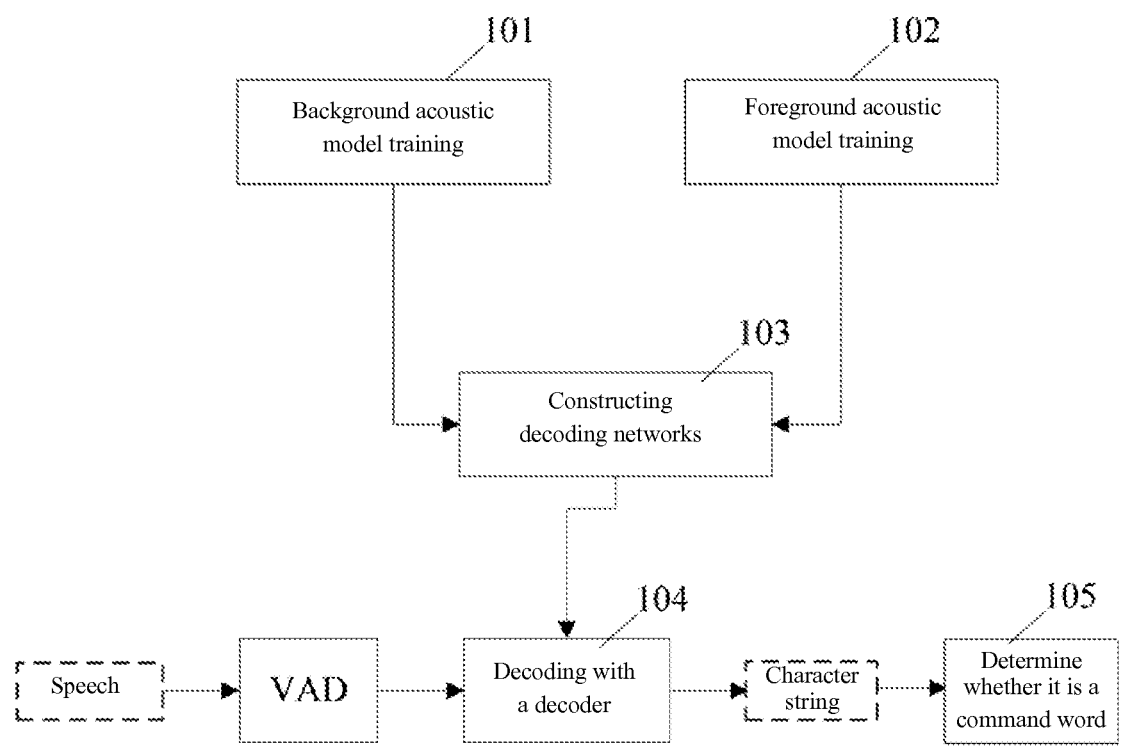
FIG. 3 is a flowchart diagram of a method for increasing speech activity detection, in accordance with some implementations.

In some implementations, the speech activity shall be further detected before the operation 104 of the present application. FIG. 3 is a flowchart diagram of a method for increasing the speech activity detection process, in accordance with some implementations. Referring to FIG. 3, before the operation 104, the method shall further conduct the processing, including voice activity detection (VAD), namely detecting speech activity.

The mentioned speech activity detection (SAD) is also called mute detection, speech endpoint detection and so on. Its main purpose is to detect the speech/non-speech from the noise speech signal, and find out the starting point and terminal point. The common method of SAD includes energy-based, zero-crossing rate, fundamental frequency, harmonic wave and so on. Of these, the most common method is energy-based, because this method can be applied into different environments. Speech activity detection is mainly divided into two parts: the first part is characteristic extraction, which expresses the possibility of speech existing; the second part is decision mechanism of speech/non-speech, which determines whether the speech exists or not.

Figure 4:
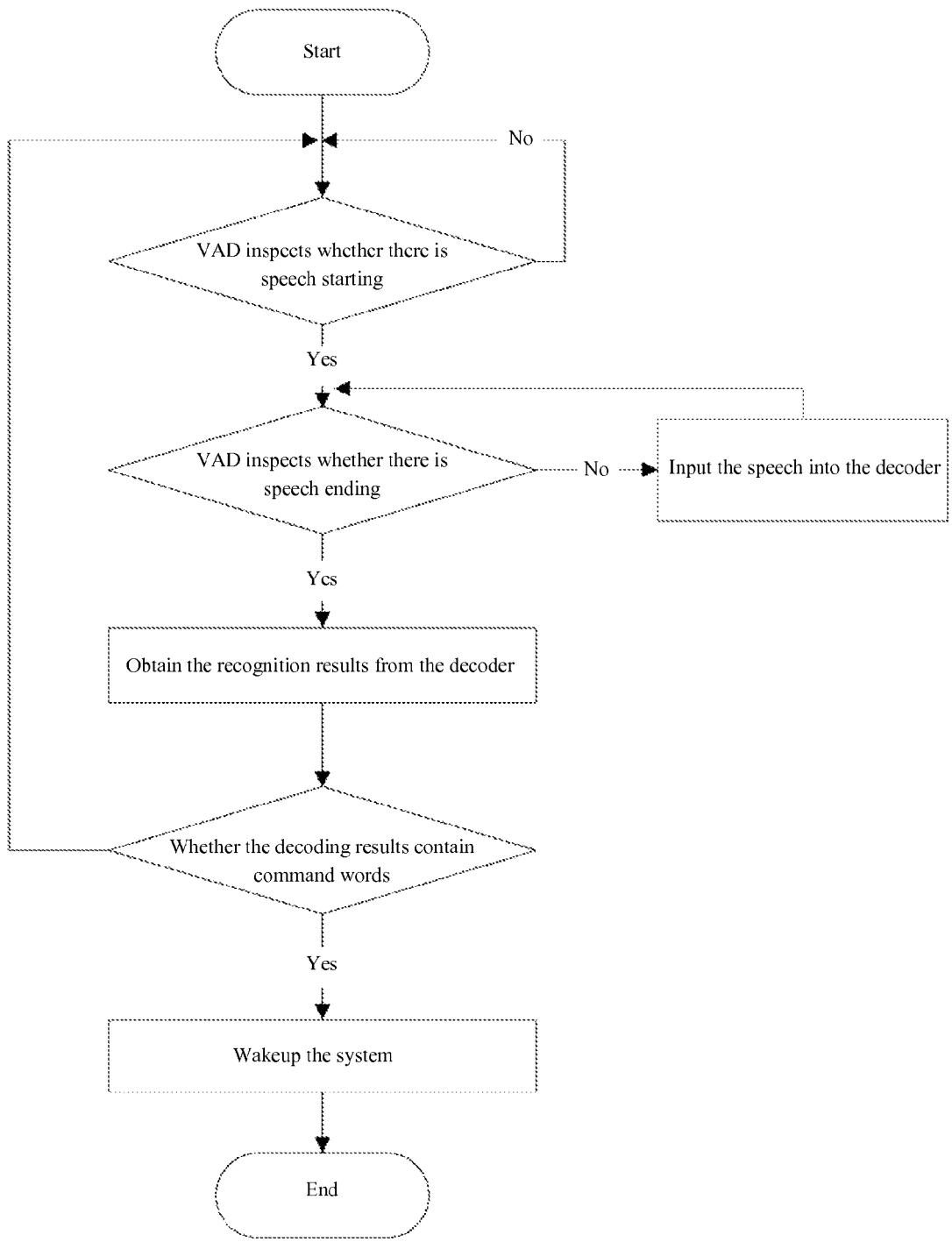
FIG. 4 is a flowchart of a method of speech command recognition through speech activity detection, in accordance with some implementations.

FIG. 4 is a flowchart diagram of a method of speech command recognition using speech activity detection. For ease of explanation, the method is described with reference to a wake up command. Namely, the system needs recognize a "wake up" speech command to wake up the corresponding device. Referring to FIG. 4, the method includes: starting to record sound when the user starts up the speech wakeup system, sending the recorded sounds to a VAD module, and using the VAD module to detect whether there is speech starting (namely whether the user has started speaking) If not detecting any speech, the method further includes continuing to wait for the next speech. If detecting the speech starting, the method includes entering into the next status, and starting sequentially inputting the speech into the decoder. The decoder decodes the input speech according to the mentioned decoding network, while detecting whether the speech ends (namely the user ends the speech). If the speech has not ended, the method includes sequentially inputting speech into decoder for decoding and, when detecting that the speech ends, extracting the decoding result from the decoder and checking whether the result contains the command word corresponding to the wake up command. If the result contains the command word, the method includes waking up the system. Otherwise, the method including sequentially keeping a dormant status.

The mentioned operation 101 to 103 of the present application can be offline processes, which means the process of constructing the decoding network is performed on a server in advance (e.g., offline). The mentioned VAD detection processes (operation 104 and operation 105) can be online processes, which means that they are performed on the client-side. The mentioned operations 101 through 103 can also be online processes running on the client-side. They can construct corresponding decoding network on the client-side according to requirements.

Figure 5:
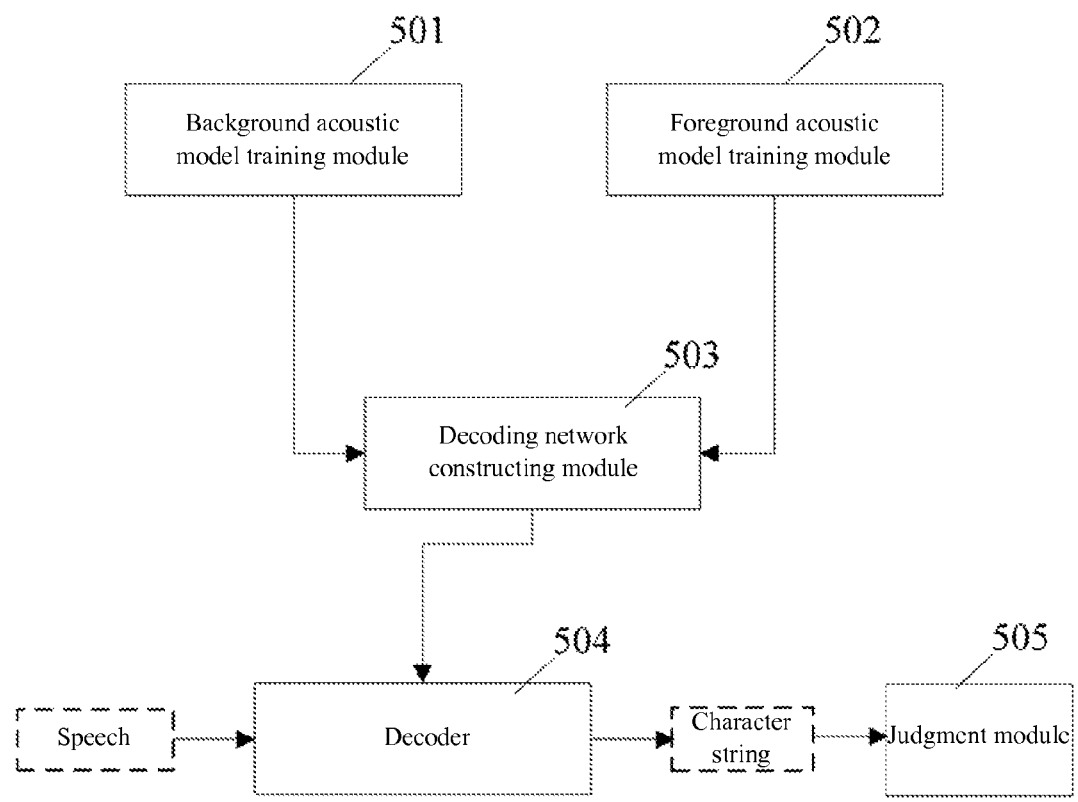
FIG. 5 is a schematic diagram of a speech command recognition system, in accordance with some implementations.

Corresponding to the aforementioned method, some implementations include a speech command recognition system to implement the aforementioned speech command recognition methods. FIG. 5 is a composition schematic view of speech command recognition system, in accordance with some implementations. Referring to FIG. 5, this system includes:

A background acoustic model training module 501 used for the acoustic model training calculation of speech lower than the specified precision to obtain background acoustic model;

A foreground acoustic model training module 502 used for the acoustic model training calculation of speech higher than the specified precision to obtain foreground acoustic model;

A decoding network constructing module 503 used for constructing the decoding network according to the mentioned foreground acoustic model and background acoustic model, among which it includes: select phoneme contained in the command word from the mentioned foreground acoustic model, use the selected phonemes to construct the decoding path corresponding to the mentioned command word, construct the corresponding decoding path according to the phonemes of the mentioned background acoustic model;

A decoder 504 used for decoding the input speech according to the mentioned decoding network;

A judgment module 505 used for judging whether the decoding result of the decoder is a character string of a specified command word, and triggering the operation corresponding to the command word when the decoding result is the character string of the specified command word.

In some implementations, in the process of acoustic model training calculation of speech lower than the specified precision, the mentioned background acoustic model training module is used for describing that Gaussian number B1 in Gaussian mixture model of phoneme is lower than the specified value; in the process of acoustic model training calculation of speech higher than the specified precision, the mentioned foreground acoustic model training module is used for describing that Gaussian number B2 in Gaussian mixture model of phoneme is higher than the specified value, and the mentioned B2 is bigger than B1. For example, the mentioned B1 is 4 or 8, the mentioned B2 is 16, 32 or over 32.

In a specific embodiment, the mentioned background acoustic model training module is concretely used for:

Conducting the acoustic model training calculation of monophone for speech, using the obtained monophone acoustic model as the background acoustic model;

Or conducting the acoustic model training calculation of triphone for speech, to obtain triphone acoustic model, making clustering for the triphone of this triphone acoustic model, using the triphone acoustic model after clustering as the background acoustic model.

In a specific embodiment, the mentioned foreground acoustic model training module is concretely used for:

Conducting the acoustic model training of triphone for speech, using the speech corresponding to command words to conduct self-adapting calculation for the obtained triphone acoustic model, using the triphone acoustic model through self-adapting calculation as the foreground acoustic model;

Conducting the acoustic model training calculation of monophone for speech, in which, the Gaussian number in Gaussian mixture model for the description of monophone shall be higher than the specified value, using the speech corresponding to command words to conduct self-adapting calculation for the obtained monophone acoustic model, using the monophone acoustic model through self-adapting calculation as the background acoustic model.

In some implementations, the command word to be recognized can be more than one, the mentioned decoding network constructing module is concretely used for: choosing the phonemes contained in each command word from the mentioned foreground acoustic model; aiming at each command word, using the chosen phonemes contained in the command word to construct a decoding path corresponding to this command word; constructing the corresponding decoding path according to all phonemes of the mentioned background acoustic model.

Figure 6:
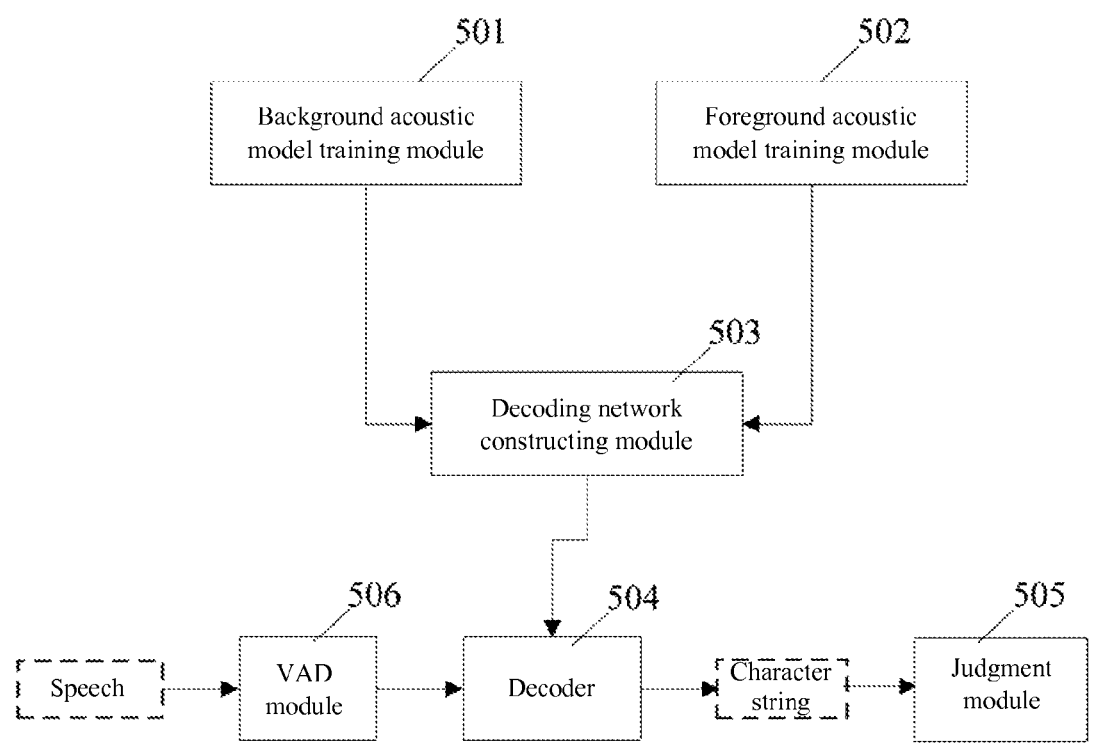
FIG. 6 is a schematic diagram of a speech command recognition system, in accordance with some implementations.

FIG. 6 is another composition schematic diagram of speech command recognition system mentioned in the present application, referring to FIG. 6, this system further includes: voice activity detection module (VAD module) 506, used for detecting speech activity, after detecting any speech starting, inputting this speech into the mentioned decoder for decoding, and sequentially detecting whether the speech ends, if it has not ended, sequentially inputting this speech into the mentioned decoder for decoding, if it ends, triggering the mentioned judgment module for corresponding processing.

Figure 7A:
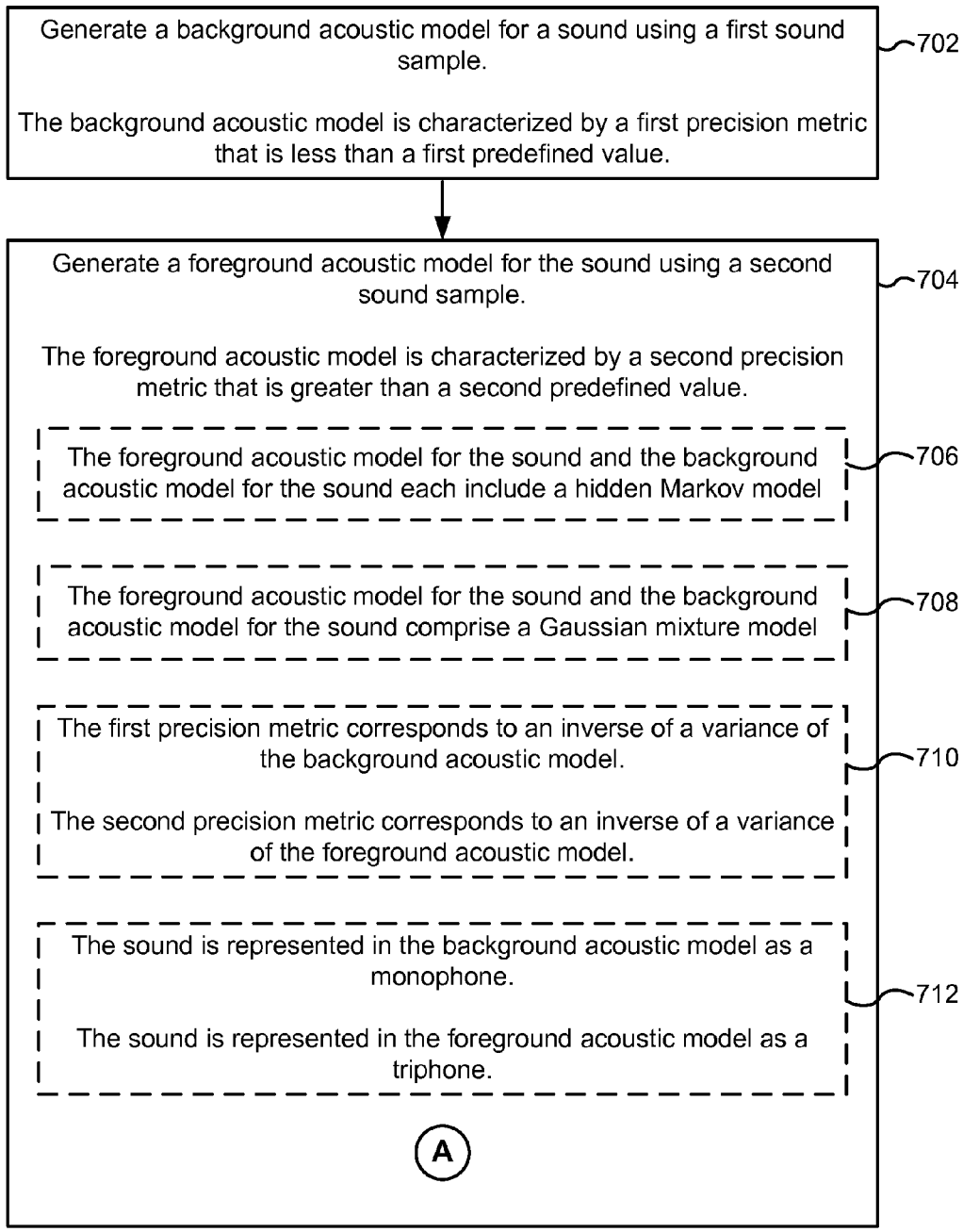
FIGS. 7A-7C is a schematic flowchart of a method for recognizing speech commands, in accordance with some implementations.
Figure 7B:
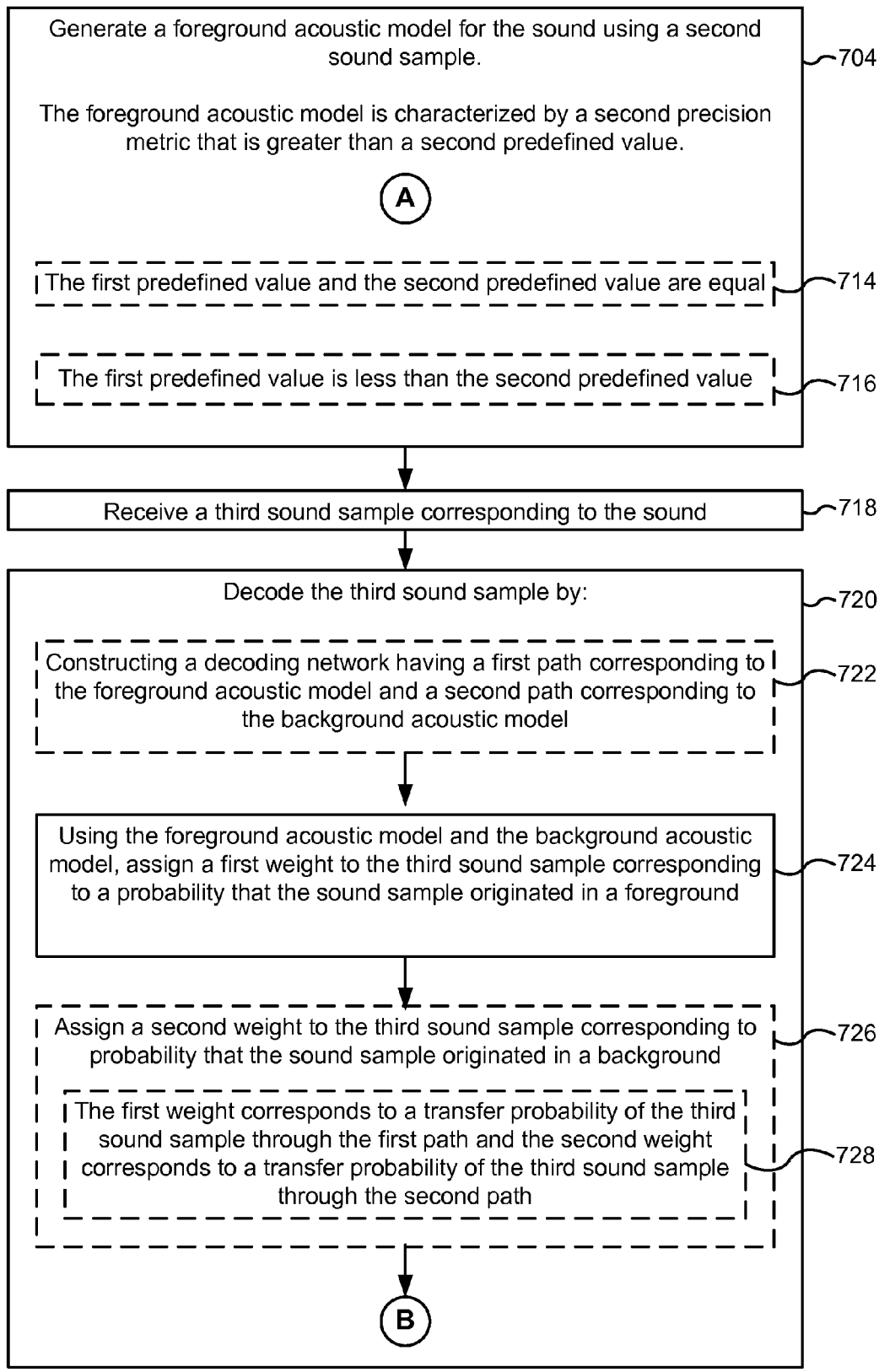
Figure 7C:
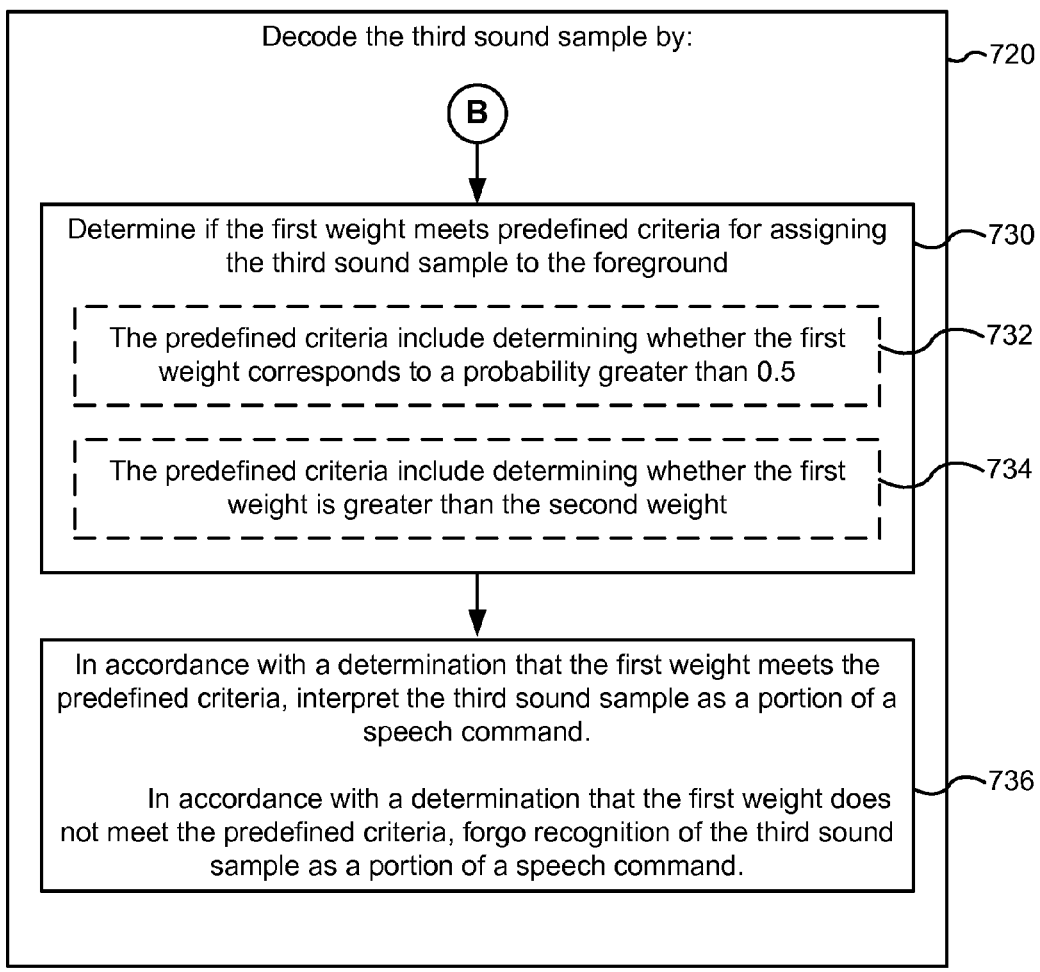

FIGS. 7A-7C is a schematic flowchart of a method 700 for recognizing speech commands, in accordance with some implementations. In some implementations, one or more of the operations described with reference to the method 700 are performed at a device (e.g., device 808/810, FIG. 8). In some implementations, one or more of the operations described with reference to the method 700 are performed at a server system (e.g., speech recognition server system 811, FIG. 8). For ease of explanation, the method 700 is described with reference to a device.

The device generates (702) a background acoustic model for a sound using a first sound sample. In some implementations, the first sound sample includes a set of sounds previously recorded from users and stored in memory (e.g., a set of sounds that is representative of a corpus). In some implementations, the first sound sample is received in real-time. For example, the device stores, in memory, an existing background acoustic model. When the first sound sample is received in real-time, the generating operation 702 serves to update the existing background acoustic model in order to generate a new background acoustic model. In any event, the background acoustic model is characterized by a first precision metric that is less than a first predefined value.

The device generates (704) a foreground acoustic model for the sound using a second sound sample. In an analogous manner, in some implementations, the second sound sample includes a set of sounds previously recorded from users and stored in memory (e.g., a set of sounds that is representative of a corpus). In some implementations, the second sound sample is received in real-time. For example, the device stores, in memory, an existing foreground acoustic model. When the first sound sample is received in real-time, the generating operation 704 serves to update the existing foreground acoustic model in order to generate a new foreground acoustic model. In any event, the foreground acoustic model is characterized by a second precision metric that is greater than a second predefined value.

In some implementations, the foreground acoustic model for the sound and the background acoustic model for the sound each include (706) a hidden Markov model.

In some implementations, the foreground acoustic model for the sound and the background acoustic model for the sound comprise (708) a Gaussian mixture mode. In some implementations, the first precision metric corresponds (710) to an inverse of a variance of the background acoustic model, and the second precision metric corresponds to an inverse of a variance of the foreground acoustic model.

In some implementations, the sound is represented (712) in the background acoustic model as a monophone, and the sound is represented in the foreground acoustic model as a triphone (e.g., as shown in FIG. 2).

In some implementations, the first predefined value and the second predefined value are (714) equal. Alternatively, in some implementations, the first predefined value is (716) less than the second predefined value.

The device receives (718) a third sound sample corresponding to the sound, and decodes (720) the third sound sample. In some implementations, the decoding operation 720 includes constructing (722) a decoding network having a first path corresponding to the foreground acoustic model and a second path corresponding to the background acoustic model. Using the foreground acoustic model and the background acoustic model, the device assigns (724) a first weight to the third sound sample corresponding to a probability that the sound sample originated in a foreground. In some implementations, the device assigns (726) a second weight to the third sound sample corresponding to probability that the sound sample originated in a background. In some implementations, the first weight corresponds (728) to a transfer probability of the third sound sample through the first path and the second weight corresponds to a transfer probability of the third sound sample through the second path.

The device then determines (730) if the first weight meets predefined criteria for assigning the third sound sample to the foreground. In some implementations, the predefined criteria include (732) determining whether the first weight corresponds to a probability greater than 0.5. In some implementations, the predefined criteria include (734) determining whether the first weight is greater than the second weight. In accordance with a determination that the first weight meets the predefined criteria, the device interprets the third sound sample as a portion of a speech command. In accordance with a determination that the first weight does not meet the predefined criteria, the device forgoes recognition of the third sound sample as a portion of a speech command.

Figure 8:
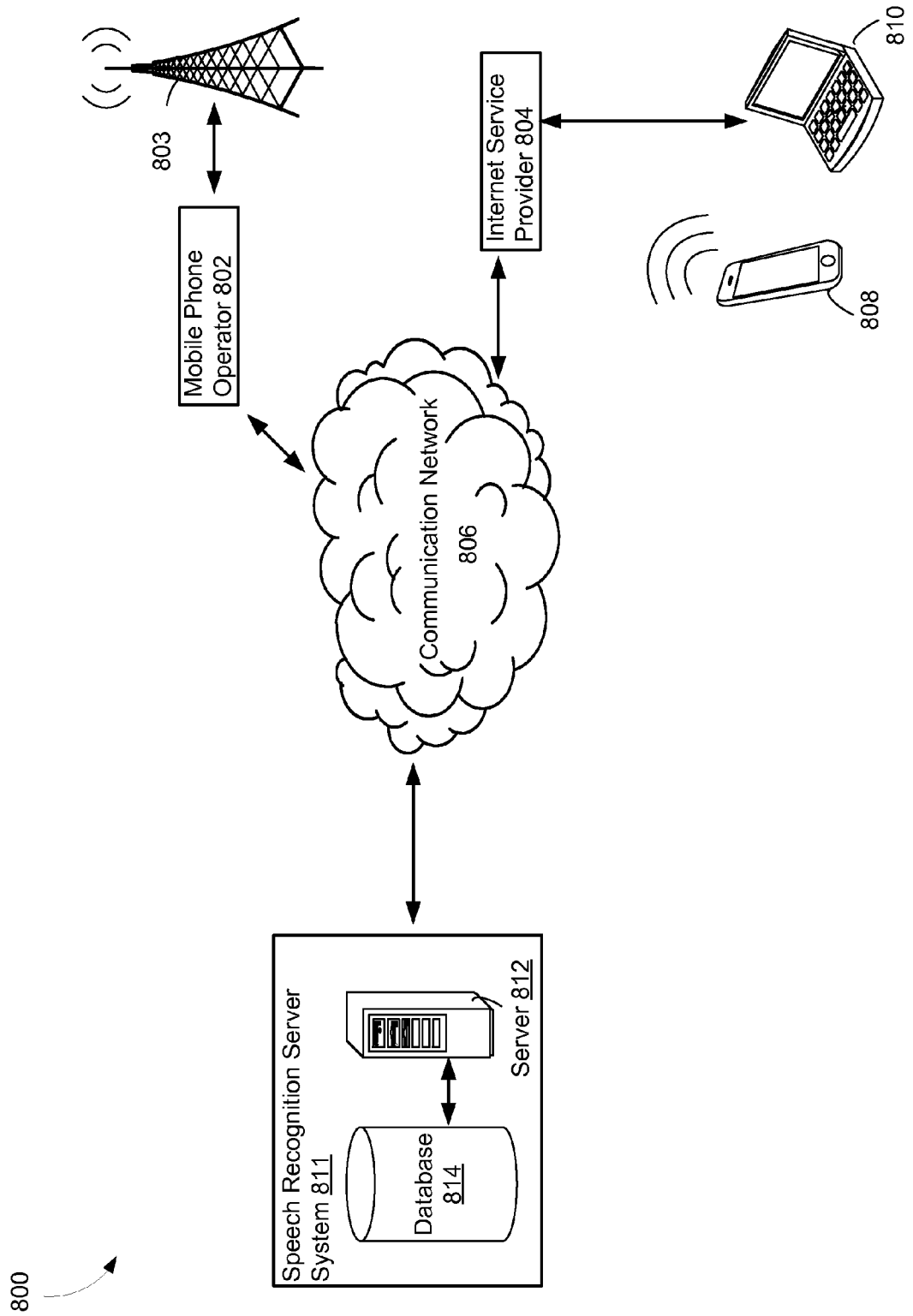
FIG. 8 is a diagram of a client-server environment for speech command recognition, in accordance with some implementations.

FIG. 8 is a diagram of a client-server environment 800 for speech command recognition, in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 800 includes one or more mobile phone operators 802, one or more internet service providers 804, and a communications network 806.

The mobile phone operator 802 (e.g., wireless carrier), and the Internet service provider 804 are capable of being connected to the communication network 806 in order to exchange information with one another and/or other devices and systems. Additionally, the mobile phone operator 802 and the Internet service provider 804 are operable to connect client devices to the communication network 806 as well. For example, a smart phone 808 is operable with the network of the mobile phone operator 802, which includes for example, a base station 803. Similarly, for example, a laptop computer 810 (or tablet, desktop, smart television, workstation or the like) is connectable to the network provided by an Internet service provider 804, which is ultimately connectable to the communication network 806.

The communication network 806 may be any combination of wired and wireless local area network (LAN) and/or wide area network (WAN), such as an intranet, an extranet, including a portion of the Internet. It is sufficient that the communication network 806 provides communication capability between client devices (e.g., smart phones 808 and personal computers 810) and servers. In some implementations, the communication network 806 uses the HyperText Transport Protocol (HTTP) to transport information using the Transmission Control Protocol/Internet Protocol (TCP/IP). HTTP permits a client device to access various resources available via the communication network 806. However, the various implementations described herein are not limited to the use of any particular protocol.

In some implementations, the client-server environment 800 further includes a speech recognition server system 811. Within the speech recognition server system 811, there is a server computer 812 (e.g., a network server such as a web server) for receiving and processing data received from the client device 808/810 (e.g., speech data). In some implementations, the speech recognition server system 811 stores (e.g., in a database 814) and maintains information corresponding to a plurality of acoustic models, language models, grammatical models, and the like.

In some implementations, the speech recognition server system 811 generates a background acoustic model for a sound using a first sound sample and stores the background acoustic model in the database 814. The background acoustic model is characterized by a first precision metric that is less than a first predefined value. In some implementations, the speech recognition server system 811 generates a foreground acoustic model for the sound using a second sound sample and stores the foreground acoustic model in the database 814. The foreground acoustic model is characterized by a second precision metric that is greater than a second predefined value. The speech recognition server system 811 receives a third sound sample corresponding to the sound. For example, the third sound sample is received in the form of a Waveform Audio File Format (WAV) file from a client device 808/810 over communications network 806. The speech recognition server system 811 decodes the third sound sample by assigning a first weight to the third sound sample corresponding to a probability that the sound sample originated in a foreground (e.g., using the foreground acoustic model and the background acoustic model, and determining if the first weight meets predefined criteria for assigning the third sound sample to the foreground). When the first weight meets the predefined criteria, the speech recognition server system 811 interprets the third sound sample as a portion of a speech command; otherwise, the speech recognition server system 811 forgoes recognition of the third sound sample as a portion of a speech command.

Those skilled in the art will appreciate from the present disclosure that any number of such devices and/or systems may be provided in a client-server environment, and particular devices may be altogether absent. In other words, the client-server environment 800 is merely an example provided to discuss more pertinent features of the present disclosure. Additional server systems, such as domain name servers and client distribution networks may be present in the client-server environment 800, but have been omitted for ease of explanation.

Figure 9:
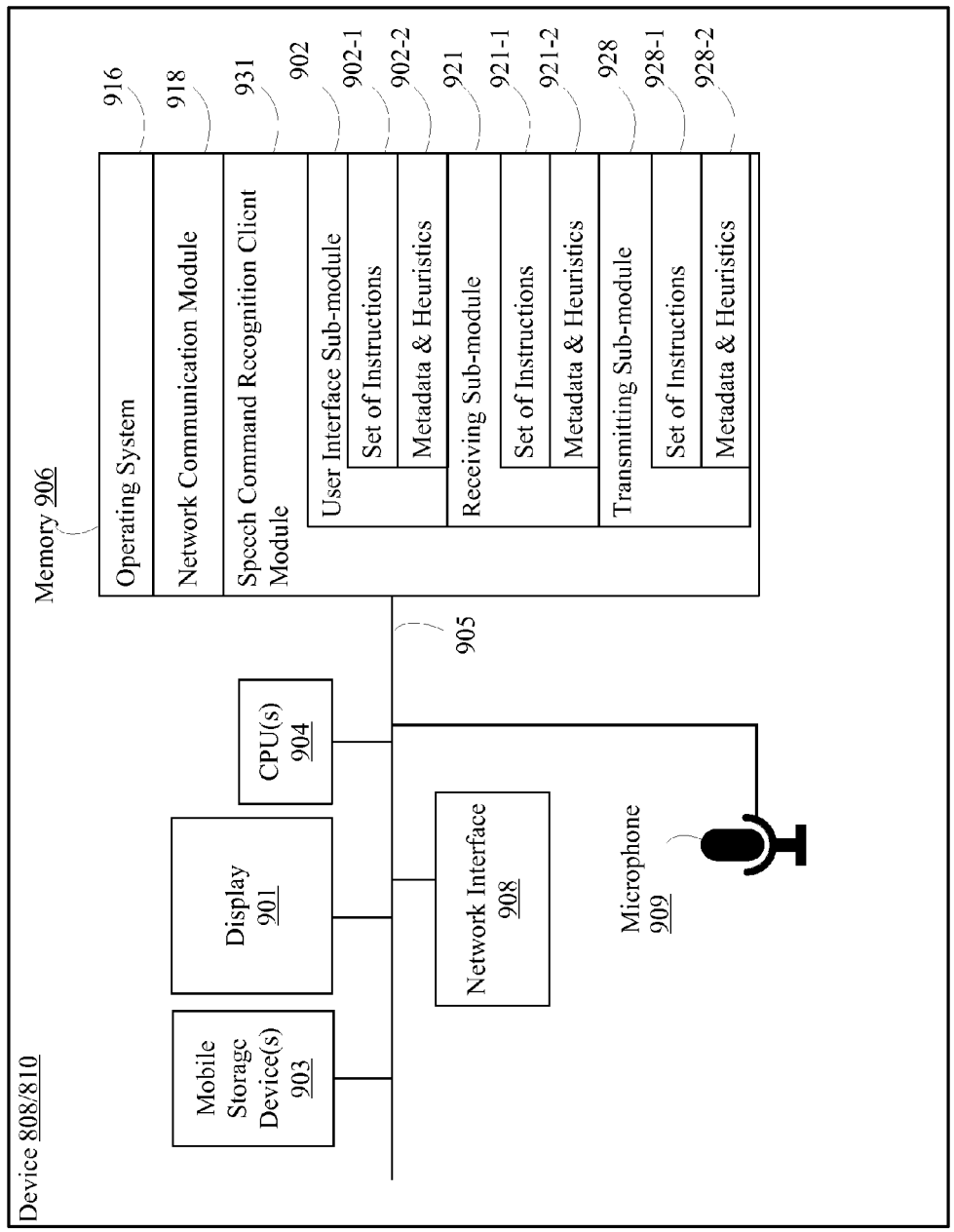
FIG. 9 is a block diagram illustrating a client device, in accordance with some implementations.

FIG. 9 is a diagram of an example implementation of the device 808/810 for speech command recognition, in accordance with some implementations. While certain specific features are illustrated, those skilled in the art will appreciate from the present disclosure that various other features have not been illustrated for the sake of brevity and so as not to obscure more pertinent aspects of the implementations disclosed herein.

To that end, the device 808/810 includes one or more processing units (CPU's) 904, one or more network or other communications interfaces 908, a display 901, memory 906, a microphone 909, one or more mobile storage devices 903, and one or more communication buses 905 for interconnecting these and various other components. The communication buses 905 may include circuitry (sometimes called a chipset) that interconnects and controls communications between system components. Memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 906 may optionally include one or more storage devices remotely located from the CPU(s) 904. Memory 906, including the non-volatile and volatile memory device(s) within memory 906, comprises a non-transitory computer readable storage medium.

In some implementations, memory 906 or the non-transitory computer readable storage medium of memory 906 stores the following programs, modules and data structures, or a subset thereof including an operating system 916, a network communication module 918, and a speech recognition client module 931.

The operating system 916 includes procedures for handling various basic system services and for performing hardware dependent tasks.

The network communication module 918 facilitates communication with other devices via the one or more communication network interfaces 908 (wired or wireless) and one or more communication networks, such as the internet, other wide area networks, local area networks, metropolitan area networks, and so on.

In some implementations, the speech command recognition client module 931 includes a user interface sub-module 902 for speech command recognition (e.g., a user activates a predefined affordance to bring up a speech command recognition user interface). To this end, the user interface sub-module 902 includes a set of instructions 902-1 (e.g., for displaying a user interface on the display 901, receiving user inputs, etc.) and, optionally, metadata 902-2. In some implementations, the speech command recognition client module 931 includes a receiving sub-module 921 having a set of instructions 921-1 (e.g., for interfacing with the microphone 909 to receive a sound sample) and, optionally, metadata 921-2, as well as a transmitting module 928 having a set of instructions 928-1 (e.g., for interfacing with the network interface 928 to transmit the sound sample to a sound recognition server system 811) and, optionally, metadata 928-2.

Figure 10:
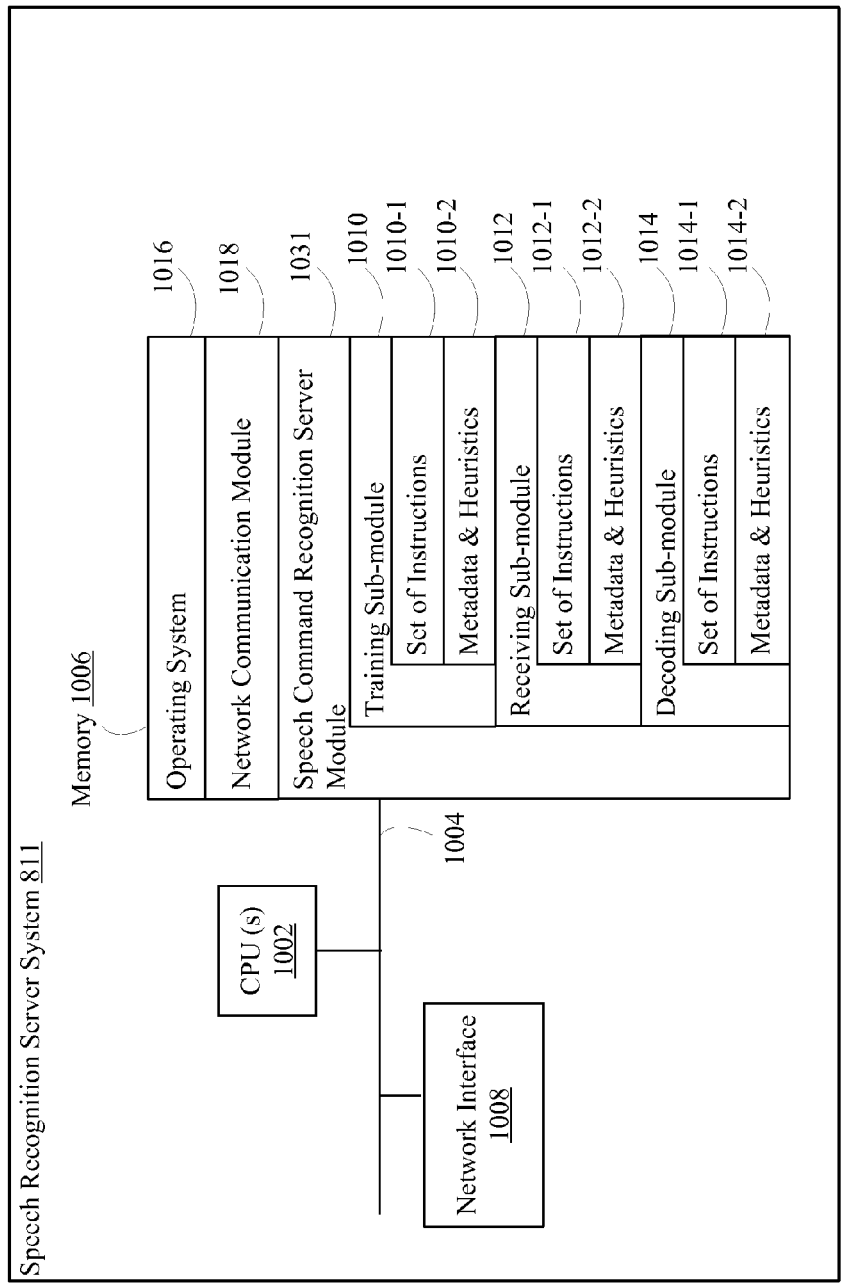
FIG. 10 is a block diagram illustrating a speech command recognition server system, in accordance with some implementations.

FIG. 10 is a block diagram illustrating a speech recognition server system 811, discussed above with reference to FIG. 8, in accordance with some implementations. While certain specific features are illustrated, those skilled in the art will appreciate from the present disclosure that various other features have not been illustrated for the sake of brevity and so as not to obscure more pertinent aspects of the implementations disclosed herein.

To that end, the speech recognition server system 811 includes one or more processing units (CPU's) 1002, one or more network or other communications interfaces 1008, memory 1006, and one or more communication buses 1004 for interconnecting these and various other components. The communication buses 1004 may include circuitry (sometimes called a chipset) that interconnects and controls communications between system components. Memory 1006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1006 may optionally include one or more storage devices remotely located from the CPU(s) 1002. Memory 1006, including the non-volatile and volatile memory device(s) within memory 6, comprises a non-transitory computer readable storage medium.

In some implementations, memory 1006 or the non-transitory computer readable storage medium of memory 1006 stores the following programs, modules and data structures, or a subset thereof including an operating system 1016, a network communication module 1018, a speech command recognition server module 1031.

The operating system 1016 includes procedures for handling various basic system services and for performing hardware dependent tasks.

The network communication module 1018 facilitates communication with other devices (e.g., other speech recognition server system 811 as well as client devices 808/810) via the one or more communication network interfaces 8 (wired or wireless) and one or more communication networks, such as the Internet, other wide area networks, local area networks, metropolitan area networks, and so on.

The speech command recognition server module 1031 is configured to receive sound samples, train acoustic models, and decode sample samples. To that end, the speech command recognition server module 1031 optionally includes one or more sub-modules, each including a set of instructions and optionally including metadata. For example, in some implementations, the speech command recognition server module 1031 receives sound samples from a client 808/810 using a receiving sub-module 1012 (which includes a set of instructions 1012-1 and metadata 1012-2), trains the acoustic models with the received sound samples using a training sub-module 1010 (which includes a set of instructions 1010-1 and metadata 1010-2) and decodes subsequent sound samples using a decoding sub-module 1014 (which includes a set of instructions 1014-1 and metadata 1014-2) As an example of metadata, in some implementations, the metadata 1010-1 optionally includes language settings corresponding to respective users, effectiveness ratings provided by the respective users, etc.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of recognizing a speech command, comprising:
   at an electronic device with one or more processors and memory:
   generating a background acoustic model for a sound using a first sound sample, wherein the sound in the background acoustic model is represented as monophones and the background acoustic model is characterized by a first precision metric that is less than a first predefined inverse variance value, and wherein the first precision metric corresponds to an inverse of a variance of the background acoustic model;
   generating a foreground acoustic model for the sound using a second sound sample, wherein the sound in the foreground acoustic model is represented as triphones and the second sound sample characterized by higher precision phonemes than the first sound sample, resulting in the foreground acoustic model being characterized by a second precision metric that is greater than a second predefined inverse variance value, and wherein the second precision metric corresponds to an inverse of a variance of the foreground acoustic model;
   receiving a third sound sample corresponding to the sound;
   decoding the third sound sample by:
   using the foreground acoustic model and the background acoustic model, assigning a first weight to the third sound sample corresponding to a probability that the sound sample originated in a foreground;
   determining if the first weight meets predefined criteria for assigning the third sound sample to the foreground;
   in accordance with a determination that the first weight meets the predefined criteria, interpreting the third sound sample as a portion of a speech command originating from a user of the electronic device; and
   in accordance with a determination that the first weight does not meet the predefined criteria, rejecting the third sound sample as having originated in the background rather than having originated from the user.

2. The method of claim 1, wherein:
   the foreground acoustic model for the sound includes a hidden Markov model; and
   the background acoustic model for the sound includes a hidden Markov model.

3. The method of claim 1, wherein the foreground acoustic model for the sound and the background acoustic model for the sound comprise a Gaussian mixture model.

4. The method of claim 1, wherein the first predefined inverse variance value and the second predefined inverse variance value are equal.

5. The method of claim 1, wherein the first predefined inverse variance value is less than the second predefined inverse variance value.

6. The method of claim 1, further including:
   constructing a decoding network having a first path corresponding to the foreground acoustic model and a second path corresponding to the background acoustic model;
   assigning a second weight to the third sound sample corresponding to probability that the sound sample originated in a background;
   wherein the first weight corresponds to a transfer probability of the third sound sample through the first path and the second weight corresponds to a transfer probability of the third sound sample through the second path.

7. The method of claim 6, wherein the predefined criteria include determining whether the first weight is greater than the second weight.

8. The method of claim 1, wherein the predefined criteria include determining whether the first weight corresponds to a probability greater than 0.5.

9. An electronic device, comprising:
   one or more processors;
   memory; and
   one or more programs, wherein the one or more programs are stored in the memory and configured to be executed by the one or more processors, the one or more programs including an operating system and instructions that when executed by the one or more processors cause the electronic device to:
   generate a background acoustic model for a sound using a first sound sample, wherein the sound in the background acoustic model is represented as monophones and the background acoustic model is characterized by a first precision metric that is less than a first predefined inverse variance value, and wherein the first precision metric corresponds to an inverse of a variance of the background acoustic model;

generate a foreground acoustic model for the sound using a second sound sample, wherein the sound in the foreground acoustic model is represented as triphones and the second sound sample characterized by higher precision phonemes than the first sound sample, resulting in the foreground acoustic model being characterized by a second precision metric that is greater than a second predefined inverse variance value, and wherein the second precision metric corresponds to an inverse of a variance of the foreground acoustic model;

receive a third sound sample corresponding to the sound;

decode the third sound sample by:

using the foreground acoustic model and the background acoustic model, assigning a first weight to the third sound sample corresponding to a probability that the sound sample originated in a foreground;

determining if the first weight meets predefined criteria for assigning the third sound sample to the foreground;

in accordance with a determination that the first weight meets the predefined criteria, interpreting the third sound sample as a portion of a speech command originating from a user of the electronic device; and in accordance with a determination that the first weight does not meet the predefined criteria, rejecting the third sound sample as having originated in the background rather than having originated from the user.

10. The electronic device of claim 9, wherein:

the foreground acoustic model for the sound includes a hidden Markov model; and the background acoustic model for the sound includes a hidden Markov model.

11. The electronic device of claim 9, wherein the foreground acoustic model for the sound and the background acoustic model for the sound comprise a Gaussian mixture model.

12. The electronic device of claim 9, wherein the first predefined inverse variance value and the second predefined inverse variance value are equal.

13. The electronic device of claim 9, wherein the first predefined inverse variance value is less than the second predefined inverse variance value.

14. The electronic device of claim 9, wherein the instructions further cause the device to:

construct a decoding network having a first path corresponding to the foreground acoustic model and a second path corresponding to the background acoustic model;

assign a second weight to the third sound sample corresponding to probability that the sound sample originated in a background;

wherein the first weight corresponds to a transfer probability of the third sound sample through the first path and the second weight corresponds to a transfer probability of the third sound sample through the second path.

15. The electronic device of claim 14, wherein the predefined criteria include determining whether the first weight is greater than the second weight.

16. The electronic device of claim 9, wherein the predefined criteria include determining whether the first weight corresponds to a probability greater than 0.5.

17. A non-transitory computer readable storage medium storing one or more programs, the one or more programs comprising instructions, which when executed by an electronic device with one or more processors and memory, cause the electronic device to:

generate a background acoustic model for a sound using a first sound sample, wherein the sound in the background acoustic model is represented as monophones and the background acoustic model is characterized by a first precision metric that is less than a first predefined inverse variance value, and wherein the first precision metric corresponds to an inverse of a variance of the background acoustic model;

generate a foreground acoustic model for the sound using a second sound sample, wherein the sound in the foreground acoustic model is represented as triphones and the second sound sample characterized by higher precision phonemes than the first sound sample, resulting in the foreground acoustic model being characterized by a second precision metric that is greater than a second predefined inverse variance value, and wherein the second precision metric corresponds to an inverse of a variance of the foreground acoustic model;

receive a third sound sample corresponding to the sound;

decode the third sound sample by:

using the foreground acoustic model and the background acoustic model, assigning a first weight to the third sound sample corresponding to a probability that the sound sample originated in a foreground;

determining if the first weight meets predefined criteria for assigning the third sound sample to the foreground;

in accordance with a determination that the first weight meets the predefined criteria, interpreting the third sound sample as a portion of a speech command originating from a user of the electronic device; and in accordance with a determination that the first weight does not meet the predefined criteria, rejecting the third sound sample as having originated in the background rather than having originated from the user.

* * * * *